P. L. ROSE.
POWER TRANSMISSION DEVICE.
APPLICATION FILED NOV. 16, 1914.
1,145,439.  Patented July 6, 1915.
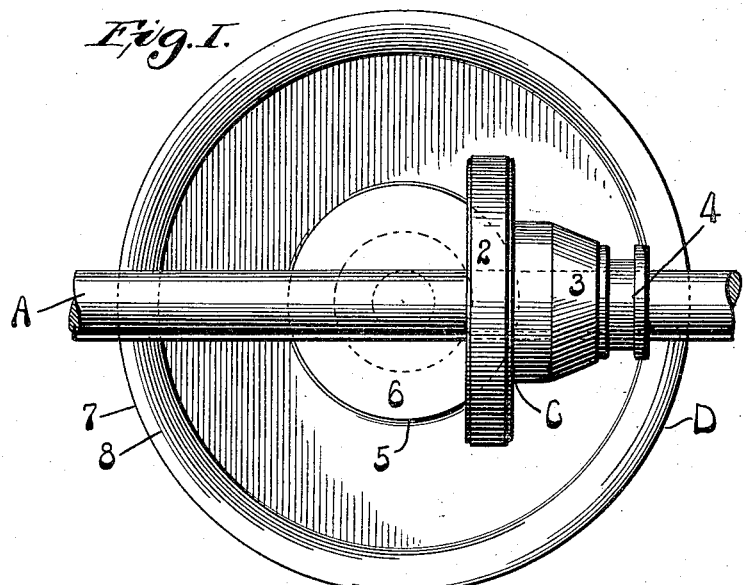
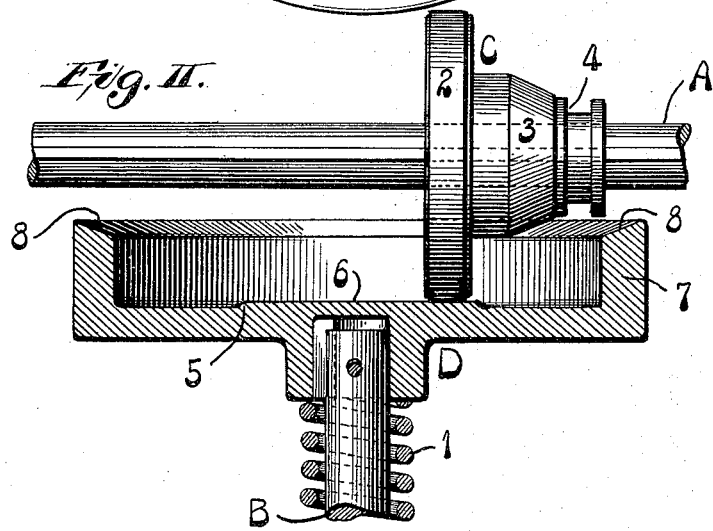
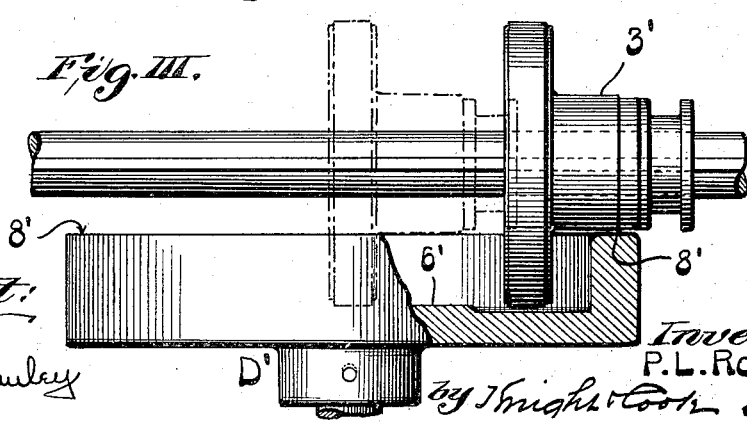
Attest:
Wm. H. Scott
A. J. McCauley
Inventor:
P. L. Rose
by Knight & Cook, attys.

UNITED STATES PATENT OFFICE.

PAUL L. ROSE, OF DEMING, NEW MEXICO.

POWER-TRANSMISSION DEVICE.

1,145,439.  Specification of Letters Patent.  Patented July 6, 1915.

Application filed November 16, 1914. Serial No. 872,374.

*To all whom it may concern:*

Be it known that I, PAUL L. ROSE, a citizen of the United States of America, a resident of Deming, in the county of Luna, State of New Mexico, have invented certain new and useful Improvements in Power-Transmission Devices, of which the following is a full, clear, and exact description, reference being had to the accompanying drawings, forming a part of this specification.

My invention relates to a power transmission device, one of the objects being to produce a simple, efficient and inexpensive transmission device adapted to be associated with a drive shaft and a driven shaft, and operable to effect a great variation in the relative speeds of said shafts. The preferred form of the invention is particularly adapted for use on motor vehicles, but it is to be understood that the invention is not in any way limited to such use.

Figure I is an elevation of a transmission device, embodying the features of my invention. Fig. II is an inverted plan view of the device shown in Fig. I, one of the friction elements being shown in section. Fig. III is a view similar to Fig. II, illustrating another form of the invention.

In the accompanying drawings: A designates a shaft, which for the sake of convenience in describing the invention, I will term a drive shaft, and B designates a driven shaft, it being understood, however, that insofar as my invention is concerned either of these shafts may be the drive shaft.

C designates a friction element splined to the shaft A, and D is a friction disk secured to the shaft B. The friction disk D is preferably forced into engagement with the friction element C by means of a spring 1.

The friction element C is provided with peripheral friction surfaces 2 and 3, the friction surface 3 being smaller in diameter than the friction surface 2. Both of the peripheral friction surfaces 2 and 3 are preferably substantially concentric to the axis of the shaft A.

4 designates a collar secured to the friction element C and provided with an annular groove for the reception of a shifter (not shown) which may be operated to slide said friction element on the shaft A.

The friction disk D is in the form of a cylindrical cup having a circular boss 5 extending outwardly from its axis at one side of the disk and provided with a substantially flat friction surface 6 adapted to engage the peripheral friction surface 2, and also having an annular rim 7 provided with a friction surface 8 adapted to engage the peripheral friction surface 3. The annular rim 7 surrounds the central circular boss 5 and the different friction surfaces 6 and 8 are located in different planes so as to coöperate respectively with the peripheral friction surfaces 2 and 3 which are also located in different planes.

The rotatable shaft B is preferably arranged at a right angle to the rotatable shaft A, and the flat friction surface 6 is preferably in a plane parallel with the axis of shaft A. When the parts occupy the positions shown in Figs. I and II, the peripheral friction surface 2 engages the flat friction surface 6 and the friction element C may be adjusted toward and away from the axis of the flat friction surface so as to vary the relative speeds of the shafts A and B.

A greater variation may be obtained by shifting the friction element C to engage its smaller friction surface 3 with the larger friction surface 8 of the friction disk D. It will be noted that, due to the pressure of the central boss 5 extending outwardly from the axis of the disk D, an annular recess is provided between the boss and the annular rim 7 and the friction element C may occupy a neutral position in which neither of its friction surfaces engage the friction disk D, and that a movement from said neutral position, in either direction, will engage the element C with the disk D.

Movement of the friction element C from neutral position to throw the friction surface 2 into engagement with the central boss 5 of the disk D results in a low speed and the nearer the surface 2 is brought to the center of the boss and the axis of said disk the slower will be the speed. Conversely, movement of the friction surface 2, outwardly from the axis of the disk along the boss 5, in one direction affords an increased speed, and movement in the opposite direction from the axis of the disk results in reverse motion. When the friction element C is shifted in either direction to a sufficient degree to carry the friction surface off of the central boss 5 and the friction surface 3 into engagement with the surface 8 of the annular rim 7 of the disk D high or maximum speed is acquired. It will, therefore, be seen that my transmission device may be operated to furnish the slowest possible speed and a maximum speed dependent only on the diameter of the diameter of the annular rim 7, and further that the maximum speed is derived immediately following the separation of the friction element C from the boss 5 of the disk 5 upon the movement of the element C in one general direction.

In Figs. I and II, I have shown beveled friction surfaces 3 and 8 adapted to engage each other when the parts are adjusted to obtain the greatest variation in the relative speeds of the shafts. In Fig. III, the friction disk D' is provided with a friction surface 8' which is approximately parallel with the flat inner friction surface 6'. The peripheral friction surface 3', shown in Fig. III, is approximately uniform in diameter throughout its length, instead of being beveled like the friction surface 3.

I claim:—

1. A transmission device comprising a friction disk having an annular side rim and a central boss extending outwardly from the axis of said disk at its side at which said rim is located, the said rim and boss being in different planes, and a second friction element having friction surfaces in different planes coöperable with said rim and boss to impart motion from said disk to said second friction element or from said second friction element to said disk.

2. A transmission device comprising a friction disk having an annular side rim and a central boss extending outwardly from the axis of said disk at its side at which said rim is located, the said rim and boss being in different planes, and a second friction element having friction surfaces in different planes coöperable with said rim and boss to impart motion from said disk to said second friction element or from said second friction element to said disk, the said disk being provided with an annular recess between said central boss and said rim.

PAUL L. ROSE.

In the presence of—
A. L. MAPLE,
H. B. HARE.

Copies of this patent may be obtained for five cents each, by addressing the "Commissioner of Patents, Washington, D. C."